Patented May 2, 1944

2,347,929

UNITED STATES PATENT OFFICE 2,347,929

ESTERS OF TERPENE COMPOUNDS

Joseph N. Borglin, Wilmington, Del., assignor to Hercules Powder Company, Wilmington, Del., a corporation of Delaware No Drawing. Application August 27, 1940, Serial No. 354,381

9 Claims. (Cl. 260—487)

This invention relates to a new series of terpene compounds and more particularly to a new series of terpene compounds having the type formula ROOCR'X in which R is the terpene alcohol formed when allo-ocimene is condensed with crotonaldehyde and the condensate is reduced, in which R' is an aliphatic or aromatic radical, and in which X is a halogen atom. It also relates to a method for the preparation of these compounds.

By the method in accordance with this invention, I react a terpene alcohol formed by condensing allo-ocimene with crotonaldehyde and subsequently reducing the condensate with a suitable halogen substituted acylating agent. In this manner, I obtain a halogen substituted acyl ester of the alcohol reacted upon.

The reduced allo-ocimene crotonaldehyde condensate which I employ in my invention may be prepared by condensing allo-ocimene with crotonaldehyde as described in Ber. 68 1435-8 (1935) by B. Arbusov and reducing the resulting aldehyde to an alcohol. For convenience, the terpene alcohol so produced will be referred to hereinafter as a "reduced allo-ocimene crotonaldehyde condensate." The reduction may for example be carried out conveniently by hydrogenation of the primary condensate, or treatment with sodium and alcohol, etc. The resulting alcohol may be saturated or unsaturated according to the extent of the hydrogenation. Catalytic hydrogenation of the unsaturated aldehyde may be accomplished using catalysts such as Raney nickel, or other nickel catalyst, or copper chromite. Temperatures of from about 50 to about 250° C. and pressures of from about 100 to about 5000 lbs./sq. in. may be employed. In addition to the reduction of the aldehyde group to a primary alcohol group, the use of Raney nickel catalyst causes hydrogenation of the double bonds in the remainder of the molecule and the product is thus a saturated alcohol. If copper chromite catalyst is used, it is possible to hydrogenate only the aldehyde group and the product is an unsaturated alcohol containing one or two double bonds.

The halogen substituted acylating agent which I use may be such an acid as, for example, monochloroacetic acid, dichloroacetic acid, trichloroacetic acid, alpha-chloropropionic acid, beta-chloropropionic acid, alpha-chlorobutyric acid, beta-chlorobutyric acid, gamma-chlorobutyric acid, a chlorovaleric acid, a chlorocaproic acid, chlorobenzoic acid, chlorolauric acid, chloromyristic acid, chlorostearic acid, chloroleic acid, chlororicinoleic acid, chlorobehenic acid, chloroerucic acid, chloromalonic acid, chlorophthalic acid, chloronaphthenic acid, chlorotrihydrophthalic acid, chloropentahydrobenzoic acid, chlorosalicylic acid, chloromandelic acid, chlorotoluic acid, phenylchloroacetic acid, etc., and the corresponding bromine, iodine, and fluorine substituted acids. It will be noted the acid may contain more than one halogen substituent. Mixtures may be used if desired. Acid anhydrides or acyl halides such as, for example, those corresponding to the acids hereinabove named are also suitable halogen substituted acylating agents.

In carrying out the method in accordance with this invention, the reduced allo-ocimene crotonaldehyde condensate is treated with the halogen substituted acylating agent utilized preferably with agitation until the reaction has been substantially completed. The reaction may be carried out at any temperature within the range from about 0° C. to about 200° C. and preferably will be carried out at a temperature within the range from about 50° C. to about 200° C. Upon completion of the reaction, the halogen substituted acyl ester may be recovered from the reaction mixture by washing the mixture with water until all acidic substances have been eliminated. Inert diluents such as benzene, petroleum ether, and the like may be employed during the reaction and during the washing step to promote purification of the product. Such diluents are readily removed by evaporation at reduced pressure. Where a halogenated acid is utilized for reaction with the reduced allo-ocimene crotonaldehyde condensate, it may react with the alcohol represented by the condensate at one or more reactive positions. It may react with a double bond in cases where the condensate is unsaturated or it may react with a hydroxyl. Thus, it will be understood that the product according to this invention may contain one or more halogen substituted acyl ester groups for each molecule of the reduced allo-ocimene crotonaldehyde condensate, and it will be appreciated that the halogen content of the product may vary accordingly. An acyl halide or an anhydride will in general react only at the hydroxyl group and does not react directly at a double bond. The product obtained may contain unreacted terpene compounds and inert diluent materials. For many uses, such impurities may be left with the product. However, if it is desired to eliminate all diluent substances, this may be accomplished by vacuum distillation.

Where it is desired to obtain products which are substantially water white, it is advisable to conduct the esterifying reaction in the absence of air or oxygen, for example under vacuum, under a blanket of carbon dioxide, or under a blanket of some other inert gas, such as nitrogen. Vacuum distillation of the final product may be utilized for further decolorization of the product.

The method in accordance with this invention will be further illustrated by the examples which follow. All parts and percentages herein are by weight unless otherwise specified.

Example 1

A mixture of 138 parts of the saturated alcohol prepared by hydrogenation of allo-ocimene crotonaldehyde condensate and 138 parts of monochloroacetic acid was heated to a temperature of 170 to 180° C. under a blanket of carbon dioxide for 8 hours. The water formed in the reaction was allowed to distill off through an 18 inch Hempel column. The reaction was continued for an additional 8 hours at 180 to 200° C. The resulting reaction mixture was then washed with water until acid free. A yield of 148 parts of material analyzing 9.1% chlorine and containing the chloroacetate of the above alcohol, was recovered.

Example 2

A mixture of 146 parts of the unsaturated alcohol prepared by the partial hydrogenation of allo-ocimene crotonaldehyde condensate and 146 parts of monochloroacetic acid was heated for 8 hours at 170 to 180° C. under a blanket of carbon dioxide. The water formed by the reaction was allowed to distill off through an 18 inch Hempel column. The reaction was then continued an additional 8 hours at 180 to 200° C. After this, the reaction mixture was washed with water until acid free. A yield of 141 parts of chloroacetate ester analyzing 6.25% chlorine was obtained.

Example 3

A mixture of 25 parts of the unsaturated alcohol prepared by partial hydrogenation of an allo-ocimene crotonaldehyde condensate and 40 parts of alpha-chloropropionic acid was heated under reflux for about 8 hours at 160 to 165° C. with a stream of carbon dioxide passing through the flask and condenser to remove water formed. The reaction mixture was water washed until acid-free, and to aid in the separation of the product about 35 parts of petroleum ether were added. After separation from the water, the petroleum ether was removed from the product by evaporation at reduced pressure. Twenty-nine parts of liquid chloroproprionate of the above alcohol, analyzing 6.2% chlorine, was recovered.

Example 4

A mixture of 25 parts of the saturated alcohol prepared by hydrogenation of allo-ocimene crotonaldehyde condensate, 30 parts of alpha-bromo-n-butyric acid was heated under reflux for about 8 hours at 160 to 165° C. with a stream of carbon dioxide passing through the reaction mixture to remove water formed. About 35 parts of petroleum ether was added to the resulting reaction mixture which was then water washed until free of acid. The petroleum ether was removed by evaporation under reduced pressure. A yield of 37 parts of liquid bromobutyrate ester, which analyzed 17.5% bromine, was obtained.

The compounds according to this invention are useful in insecticides. For example, they may be used in kerosene solutions in a concentration between about 0.5% and about 50%, as contact spray insecticides, or in emulsions. The compounds may also be incorporated with other toxic agents, such as pyrethrum and rotenone, upon which they exert an activating effect. They find further use as slowly evaporating solvents for nitrocellulose, ethyl cellulose, and other cellulose derivatives, and are useful as intermediates in the preparation of thiocyanates and other derivatives.

The term "aromatic" as used herein and in the claims includes any radical containing a benzene linkage in its structure. The term "aliphatic" is used herein and in the claims in its broadest sense, including not only open chain radicals, but also alicyclic or naphthenic radicals.

This application is a continuation-in-part of my previous application Serial No. 311,170, filed December 27, 1939, Patent No. 2,217,685 which in turn is a continuation-in-part of my application Serial No. 198,687, filed March 29, 1938, Patent No. 2,217,611.

It will be understood that the details and examples hereinbefore set forth are illustrative only, and that the invention as broadly described and claimed is in no way limited thereby.

What I claim and desire to protect by Letters Patent is:

1. A terpene compound having the type formula ROOCR'X in which R is a radical of a reduced allo-ocimene crotonaldehyde condensate, in which R' is a radical selected from the group consisting of aliphatic radicals and aromatic radicals, and in which X represents at least one halogen atom.

2. A terpene compound having the type formula ROOCR'Cl, in which R is a radical of a reduced allo-ocimene crotonaldehyde condensate, and in which R' is a radical selected from the group consisting of aliphatic radicals and aromatic radicals.

3. A terpene compound having the type formula ROOCR'Cl in which R is a radical of a reduced allo-ocimene crotonaldehyde condensate and in which R' is an aliphatic radical.

4. A chloroacetate of a reduced allo-ocimene crotonaldehyde condensate.

5. A chloropropionate of a reduced allo-ocimene crotonaldehyde condensate.

6. A chlorobutyrate of a reduced allo-ocimene crotonaldehyde condensate.

7. A chloroacetate of a reduced saturated allo-ocimene crotonaldehyde condensate.

8. A chloropropionate of a reduced saturated allo-ocimene crotonaldehyde condensate.

9. A cholorbutyrate of a reduced saturated allo-ocimene crotonaldehyde condensate.

JOSEPH N. BORGLIN.